United States Patent
Tan et al.

(10) Patent No.: US 7,490,771 B2
(45) Date of Patent: Feb. 17, 2009

(54) REFLECTIVE ENCODER WITH INTERCHANGABLE LENS ON EMITTER-DETECTOR MODULE

(75) Inventors: Cheng Why Tan, Bukit Tengah (MY); Yee Loong Chin, Taman Pinji Mewah (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/370,133

(22) Filed: Mar. 6, 2006

(65) Prior Publication Data
US 2007/0205285 A1    Sep. 6, 2007

(51) Int. Cl.
*G06K 7/10* (2006.01)
*G01D 5/34* (2006.01)

(52) U.S. Cl. .................. 235/454; 250/231.13
(58) Field of Classification Search ............ 235/462.22, 235/454, 462.47, 462.43, 462.49, 472.03, 235/462.11, 462.41; 250/231.13, 231.14
See application file for complete search history.

(56) References Cited

U.S. PATENT DOCUMENTS

| | | | | |
|---|---|---|---|---|
| 2,456,711 A | * | 12/1948 | Knutson et al. | 353/101 |
| 3,869,599 A | * | 3/1975 | Sansone | 235/472.03 |
| 5,519,198 A | * | 5/1996 | Plesko | 235/462.4 |
| 5,602,379 A | * | 2/1997 | Uchimura et al. | 235/462.11 |
| 5,756,981 A | * | 5/1998 | Roustaei et al. | 235/462.42 |
| 5,786,586 A | * | 7/1998 | Pidhirny et al. | 235/472.01 |
| 6,273,338 B1 | * | 8/2001 | White | 235/462.42 |
| 2003/0067608 A1 | * | 4/2003 | Steegmuller | 356/496 |
| 2004/0061044 A1 | * | 4/2004 | Soar | 250/231.13 |
| 2005/0033512 A1 | * | 2/2005 | Skarine | 701/211 |
| 2006/0097051 A1 | * | 5/2006 | Foo et al. | 235/454 |

\* cited by examiner

*Primary Examiner*—Daniel A Hess (57) ABSTRACT

An encoder having a code strip and an emitter-detector module is disclosed. The code strip includes alternating reflective and opaque stripes. The emitter-detector module includes a housing, a lens insert, a light source and a photodetector. Light from the light source illuminates the code strip, and light reflected from the code strip is incident on the photodetector. The lens insert includes a lens that processes light generated by the light source either before the light reaches the code strip or after the light is reflected from the code strip. The lens insert mates with the housing to position the lens at a predetermined point relative to the light source or the photodetector. The housing will accept a plurality of lens inserts, each lens insert having a different lens from the others of the lens inserts.

14 Claims, 6 Drawing Sheets

REFLECTIVE ENCODER WITH INTERCHANGABLE LENS ON EMITTER-DETECTOR MODULE

BACKGROUND OF THE INVENTION

Encoders provide a measurement of the position of a component in a system relative to some predetermined reference point. Encoders are typically used to provide a closed-loop feedback system to a motor or other actuator. For example, a shaft encoder outputs a digital signal that indicates the position of the rotating shaft relative to some known reference position that is not moving. A linear encoder measures the distance between the present position of a moveable carriage and a reference position that is fixed with respect to the moveable carriage as the moveable carriage moves along a predetermined path.

Optical encoders utilize a light source and a photodetector to measure changes in the position of an encoding disk or strip. In a transmissive encoder, the encoding disk includes a series of alternating opaque and transparent strips. The light source is located on one side of the code strip, and the photodetector is located on the other side of the encoding strip. The light source and photodetector are fixed relative to one another, and the code strip moves between the photodetector such that the light reaching the photodetector is interrupted by the opaque regions of the code strip. The position of the code strip is determined by measuring the transitions between the light and dark regions observed by the photodiode.

In a reflective encoder, the light source and photodetector are located on the same side of the encoding strip, and the encoding strip consists of alternating reflective and absorbing stripes. The light source is positioned such that light from the light source is imaged into the detector when the light is reflected from the reflective strips.

Transmissive encoders have a number of advantages over reflective encoders in terms of tolerance and contrast ratios. Transmissive encoders are typically constructed from two separate sub-assemblies, a light source and a detector. In a transmissive encoder, the light from the light source is colliminated before it reaches the code strip, and hence, the light leaving the code strip is also colliminated. The light source is typically constructed from an LED and a collimating lens. The only critical distance is the distance from the lens to the LED, which can be tightly controlled by the manufacturer of the light source sub-assembly. The detection assembly needs only to image this colliminated light onto the detector surface. Hence, the only critical distance is the distance from the imaging lens to the detector, which can also be tightly controlled by the detector manufacturer independent of the specific encoder assembly. Furthermore, the same sub-assemblies can be utilized for a wide variety of encoders, since the distances between the light source and the code strip and between the code strip and the detector module are not critical.

In a reflective encoder, in contrast, the distance between the code strip and the detector is critical as either the code strip itself or the light source as seen in the reflected light from the code strip is imaged into the detector. However, reflective encoders have the advantage of requiring only one component, namely an emitter-detector module that includes the LED, photodetector, and one or more lenses. Hence, the manufacturer of the encoder needs to mount and align only one component. Furthermore, the encoder design does not have to provide space for the light source on the other side of the code strip. As the size of encoders is reduced in response to smaller mechanical systems, eliminating the need to mount components on both sides of the code strip becomes increasingly important.

Prior art emitter-detector modules for reflective encoders must be custom designed for each encoder design. The lenses within the emitter-detector module must be chosen to match the code disk resolution and size as well as the distance between the code strip and the emitter-detector module. In prior art designs, the light source and the photodetector are typically mounted on a substrate and then encapsulated in a clear resin. The top surface of the resin is molded to provide the lens functions. Hence, different emitter-detector modules require different molds. This reduces the economies of scale in the manufacture of the emitter-detector modules, and hence, increases the cost and product cycle times.

SUMMARY OF THE INVENTION

The present invention includes an encoder having a code strip and an emitter-detector module. The code strip includes alternating reflective and opaque stripes. The emitter-detector module includes a housing, a lens insert, a light source and a photodetector. Light from the light source illuminates the code strip, and light reflected from the code strip is incident on the photodetector. The lens insert includes a lens that processes light generated by the light source either before the light reaches the code strip or after the light is reflected from the code strip. The lens insert mates with the housing to position the lens at a predetermined point relative to the light source or the photodetector. The housing will accept a plurality of lens inserts, each lens insert having a different lens from the others of the lens inserts. Housing a plurality of such lens inserts can also be utilized. The housing includes a mechanism for adjusting a distance between the lens and either the light source or the photodetector.

DETAILED DESCRIPTION OF THE PREFERRED EMBODIMENTS OF THE INVENTION

Figure 1:
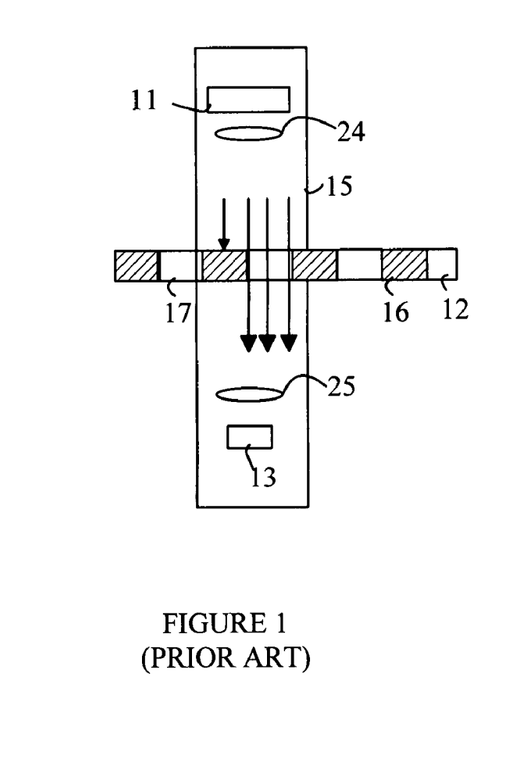
FIG. 1 illustrates a transmissive encoder.
Figures 2, 3:
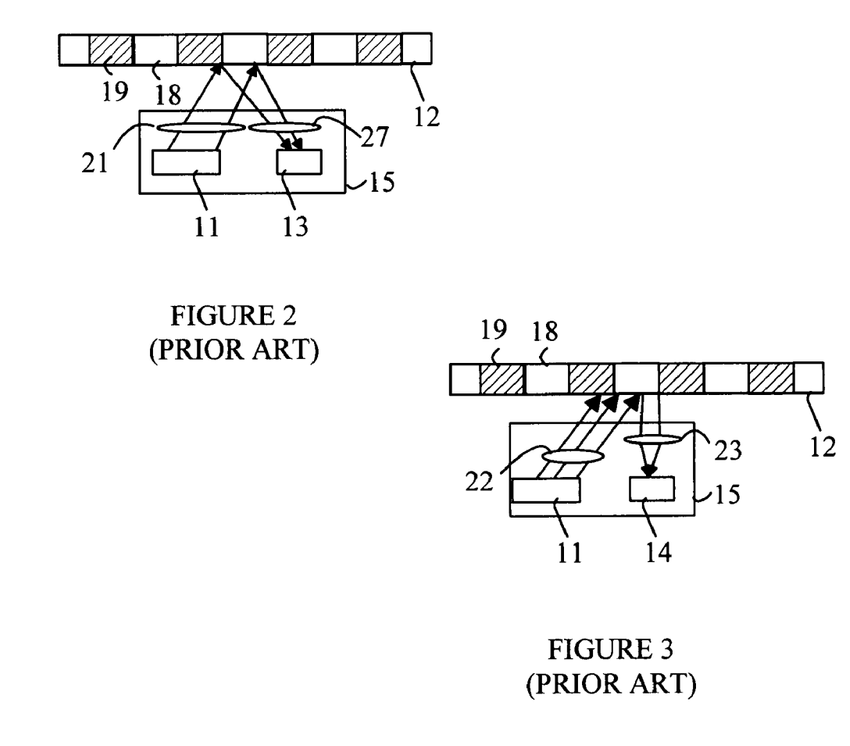
FIG. 2 illustrates one type of reflective encoder.
FIG. 3 illustrates another form of imaging encoder.

Refer now to FIGS. 1-3, which illustrate some typical encoder designs. The encoder can be divided into an emitter-detector module 15 and a code wheel or code strip. Module 15 includes a light emitter 11 that illuminates a portion of the code strip 12. The illuminated code strip is viewed by a detector 13. The emitter typically utilizes an LED as the light source. The detector is typically based on one or more photodiodes. FIG. 1 illustrates a transmissive encoder. In transmissive encoders, the light from the emitter is collimated into a parallel beam by a collimating optic such as lens 24. Code strip 12 includes opaque stripes 16 and transparent stripes 17. When code strip 12 moves between emitter 11 and detector 13, the light beam is interrupted by the opaque stripes on the code strip. The photodiodes in the detector receive flashes of light. The resultant signal is then used to generate a logic signal that transitions between logical one and logical zero.

The detector can include an imaging lens 25 that images the collimated light onto the photodiode. Lens 25 can be used to adjust the size of the light stripes to match the size of the photodiode or photodiodes in the detector. When used in this manner, the photodetector is placed at a point between the code strip and the focal point of lens 25. The distance between the photodetector and the lens determines the size of the code strip image on the photodetector.

In general, a transmissive encoder is constructed from two separate sub-modules that are provided to the manufacturer of the encoder. The first sub-module includes the light source consisting of emitter 11 and lens 24. The second sub-module consists of photodetector 13 and lens 25. Since the light is collimated, the only critical distances are those between emitter 11 and lens 24 and between lens 25 and photodetector 13. These distances can be controlled to a high level of precision by the sub-module manufacturer. Hence, the tolerances that need to be maintained by the encoder manufacturer are substantially reduced in transmissive designs. However, transmissive encoders are more expensive from the point of view of the entity assembling the encoder, since two sub-modules must be mounted and aligned.

In addition, one or both of the sub-modules can be utilized in a large number of different encoder designs. For example, if the light emitter sub-module provides a collimated beam of sufficient intensity and cross-sectional area, that sub-module can be used with a large number of code strips and detector sub-modules.

FIG. 2 illustrates one type of reflective encoder. In reflective encoders, the code strip includes reflective stripes 18 and absorptive stripes 19. The emitter includes an optical system such as a lens 21 that images the emitter light source into the detector when the light strikes a reflective stripe on the code strip. The light from the emitter is reflected or absorbed by the stripes on the code strip. The output from the photodetector is again converted to a logic signal. In embodiments in which the photodetector includes a plurality of photodiodes that provide a signal that depends on matching an image of the strips to the photodiodes, a second lens 27 can be included to adjust the size of the code strip image to the size of the photodetectors in a manner analogous to that described above.

FIG. 3 illustrates another form of imaging encoder. An imaging encoder operates essentially the same as the reflective encoder described above, except that module 15 includes imaging optics 23 that form an image of the illuminated code strip on the detector 14. In addition, the light source is processed by lens 22 such that the code strip is uniformly illuminated in the region imaged onto the detector.

Figure 4:
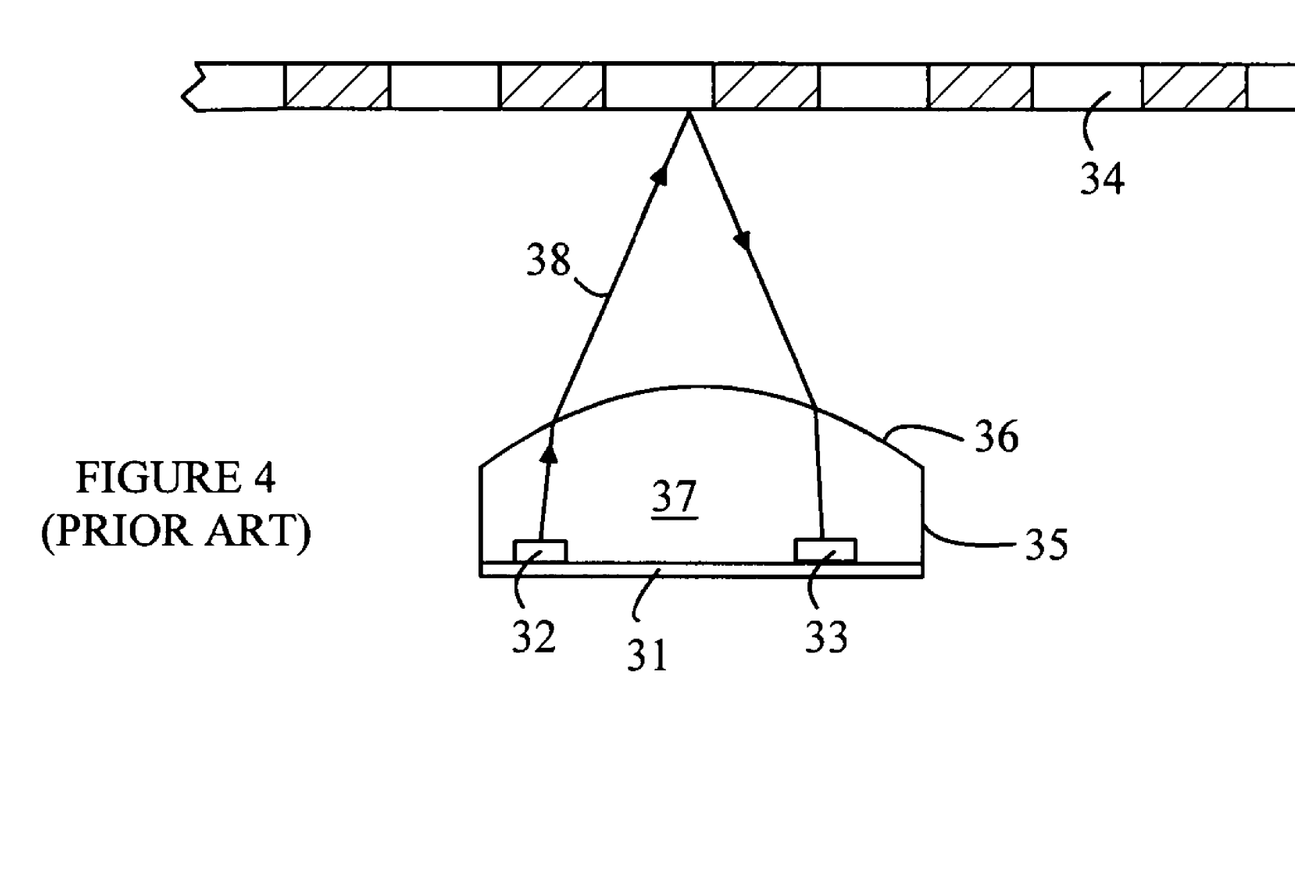
FIG. 4 illustrates a typical reflective encoder layout.

Refer now to FIG. 4, which illustrates a typical reflective encoder layout. The code wheel 34 is illuminated with light from emitter-detector module 37 that includes an LED 32 and a photodetector 33 that are mounted on a substrate 31. Photodetector 33 includes one or more photodiodes. The number of photodiodes depends on the particular encoder design. These components are encapsulated in a clear epoxy layer 35 having a top surface 36 that is molded to provide a lens that images the light from LED 32 that is reflected from code wheel 34 onto photodetector 33. A ray of the imaged light source is shown at 38. In both of the reflective encoders discussed above, the lenses used depend on the size of the portion of the code strip that is to be illuminated, the distance between the code strip and the module, and on the magnification factor used in imaging the code strip onto the photodetector. Hence, a different mold is typically required for each design. This reduces the economies of scale in the manufacturing of the emitter-detector module and increases the design cycle time when a new encoder is to be manufactured.

Figure 5:
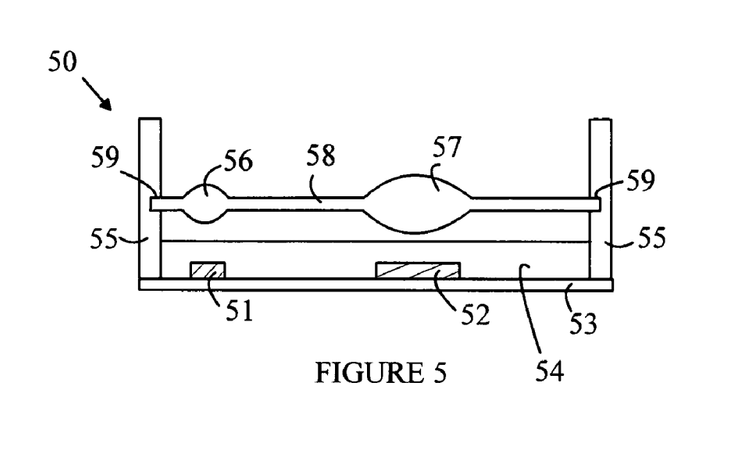
FIG. 5 is a cross-sectional view of an emitter-detector module 50 according to one embodiment of the present invention.

The manner in which the present invention overcomes these problems can be more easily understood with reference to FIG. 5, which is a cross-sectional view of an emitter-detector module 50 according to one embodiment of the present invention. Emitter-detector module 50 includes a light source 51 and a photodetector 52 that are mounted on a base 53 and encapsulated in a layer 54 of clear resin to protect the light source and photodetector dies from the environment. The light source is typically an LED. The photodetector is typically constructed from one or more photodiodes depending on the particular type of encoder. For example, in a two-channel encoder, the photodetector would have 4 photodiodes placed adjacent to one another having shapes that are similar to the shape of the stripes on the code strip of the encoder. Emitter-detector module 50 also has two vertical sections 55 that include slots 59 for receiving a lens module 58. In the embodiment shown in FIG. 5, lens module 58 includes two lenses 56 and 57. For example, Lens 56 could set the illumination pattern on the code strip, and lens 57 could set the magnification of the code stripe image on photodetector 52.

Emitter-detector module 50 can utilize a number of different lens modules to accommodate different encoder designs and emitter-detector module to code strip distances. Hence, the remaining part of the assembly can be used for a number of different encoder designs. This provides improved economy of scale, since the module manufacturer needs to only inventory the emitter-detector module and a number of different lenses. At most, a new encoder design would require that a new lens insert be manufactured.

Figure 6:
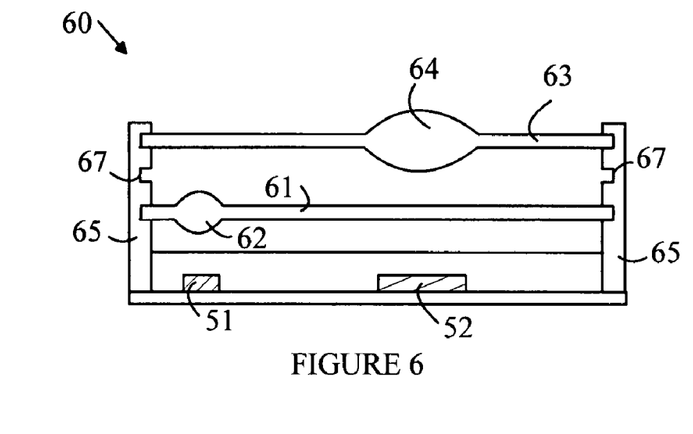
FIG. 6 is a cross-sectional view of another embodiment of an emitter-detector module according to the present invention.

In the above-described embodiment of the present invention, a single lens insert is utilized to provide both of the possible lenses needed by the emitter-detector module. However, arrangements in which multiple lens inserts are utilized with each insert having a single lens can also be constructed. Refer now to FIG. 6, which is a cross-sectional view of another embodiment of an emitter-detector module according to the present invention. Emitter-detector module 60 includes two lens inserts. Lens insert 61 includes a lens 62 for light source 51, and lens insert 63 includes a lens 64 for imaging the code strip onto photodetector 52. The sidewalls 65 of emitter-detector module 60 include additional slots for accommodating the second lens insert. The lens inserts can be constructed from a transparent material such that a number of lens inserts can be stacked.

The embodiment shown in FIG. 6 requires the emitter-detector module manufacturer to inventory significantly fewer types of lens insert, since the lenses can be changed separately. In addition, support 65 can include additional slots such as those shown at 67 to enable any of the lens inserts to be placed at a different distance from the light source or photodetector. As noted above, in some encoder designs an image of the code strip is projected onto the photodetector at a magnification that matches the code strip stripes to the specific photodiodes in the photodetector. A lens such as lens 64 can be used to set the magnification factor. The magnification factor can be changed by changing the lens and/or changing the distance from the lens to the photodetector. These additional slots provide a mechanism for changing the magnification without requiring a new lens.

Figure 7:
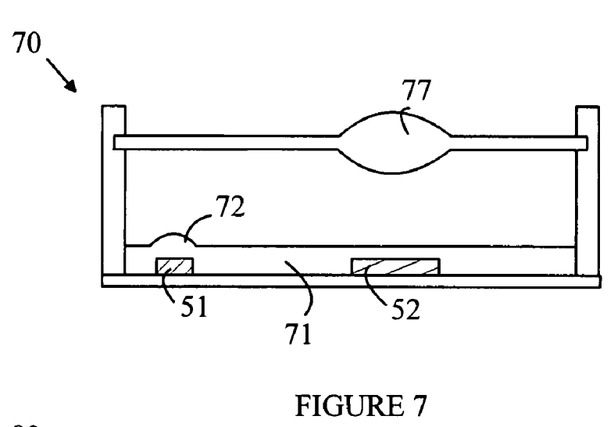
FIG. 7 is a cross-sectional view of another embodiment of an emitter-detector module according to the present invention.

In the above-described embodiments, the lenses utilized by the light source and photodetector are all incorporated in the emitter-detector module via lens inserts. However, embodiments in which the encapsulation layer also includes one or more lenses can also be constructed. Refer now to FIG. 7, which is a cross-sectional view of another embodiment of an emitter-detector module according to the present invention. Emitter-detector module 70 includes an encapsulation layer 71 that has a lens 72 molded therein. For example, this lens can provide the lens function for the light source in an embodiment in which the light source provides collimated light. Since the relationship of the lens to the light source is fixed in such embodiments, there is no need to provide this function on a separate lens insert. In this case, the lens insert is used to provide the lens function for photodetector 52 via lens 77.

Figure 8:
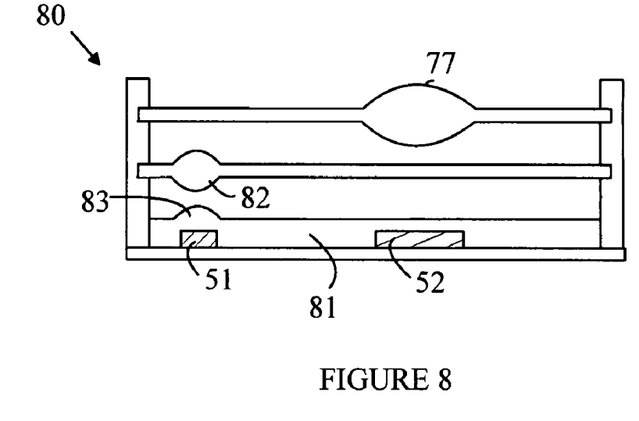
FIG. 8 is a cross-sectional view of another embodiment of an emitter-detector module according to the present invention.

Including one or more lenses in the encapsulation layer also makes it possible to provide an emitter-detector module that is configured for some common encoder design without any additional lens, while allowing that emitter-detector module to be used in other emitter-detector module designs by adding one or more lens inserts. Refer now to FIG. 8, which is a cross-sectional view of another embodiment of an emitter-detector module according to the present invention. Emitter-detector module 80 includes an encapsulation layer 81 having a lens 83 molded therein. A second lens insert having a lens 82 converts the optical system for the light source to a compound lens having properties determined by the properties of both lenses.

Figure 9:
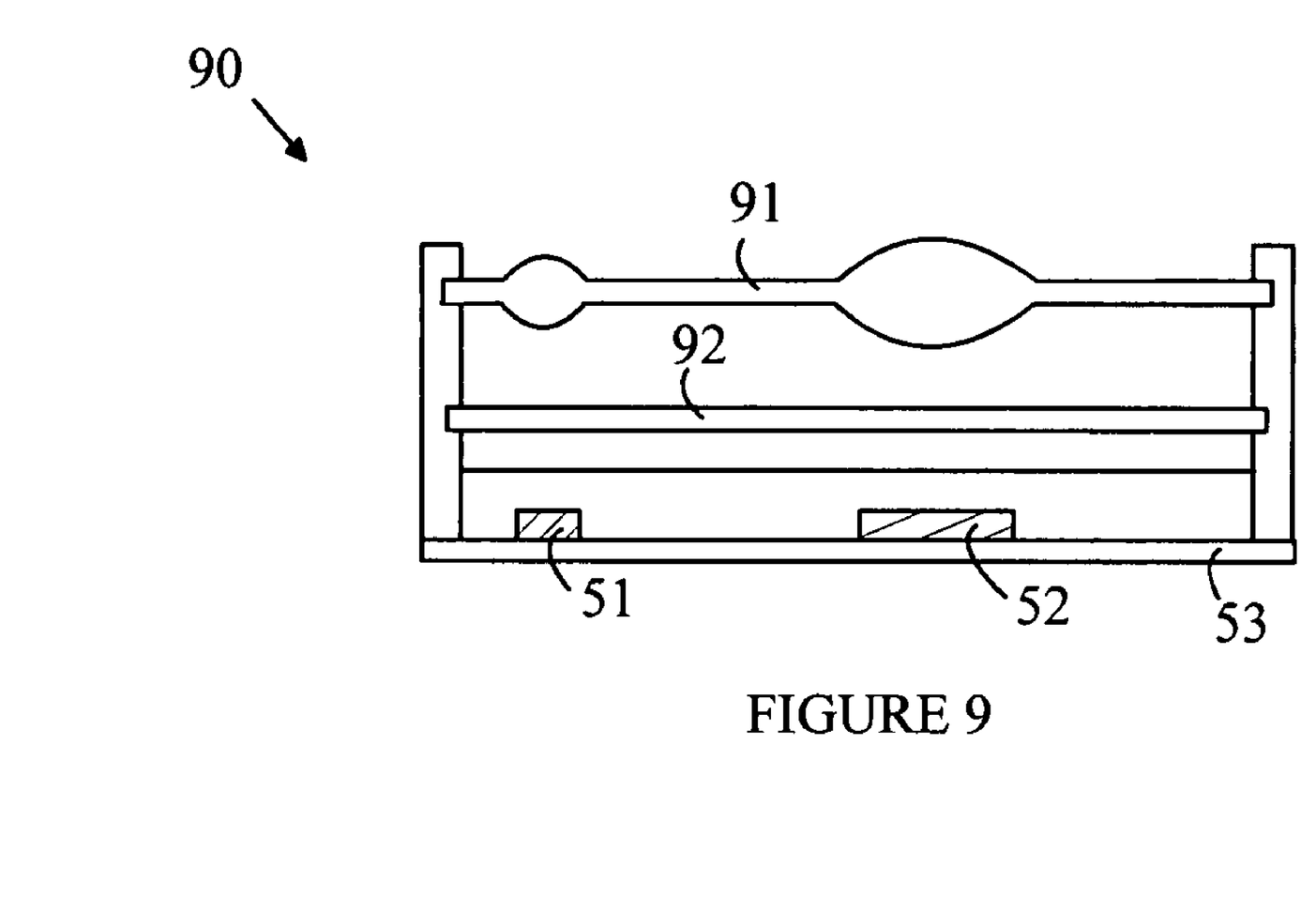
FIG. 9 is a cross-sectional view of another embodiment of an emitter-detector module according to the present invention.

While the above-identified embodiments have utilized lens inserts to modify the imaging properties of the light source and photodetectors, it should be noted that the same insert arrangement can be utilized to insert filters that may be useful in some encoder designs. For example, a planar insert can be utilized to provide a color filter to reduce background noise. In general, the LEDs used for light sources have a narrow emission spectrum. Hence, it is advantageous to include a color filter over the photodetector to remove background light that is not in the desired emission spectrum. A lens insert consisting of a planar sheet that contains the desired filter can be utilized for this purpose. Refer now to FIG. 9, which is a cross-sectional view of another embodiment of an emitter-detector module according to the present invention. Emitter-detector module 90 includes a lens insert 91 having two lenses. A filter insert 92 is placed over photodetector 52 and light source 51. Filter 92 limits the response of the emitter-detector module to a specified spectral band that includes light generated by light source 51.

Figure 10:
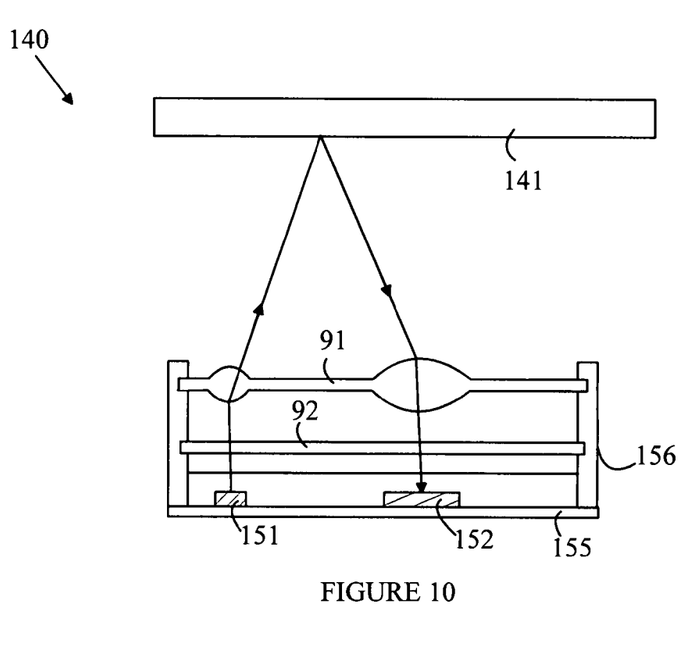
FIG. 10 is a cross-sectional view of encoder 140 through line 10'-10' shown in FIG. 11.
Figure 11:
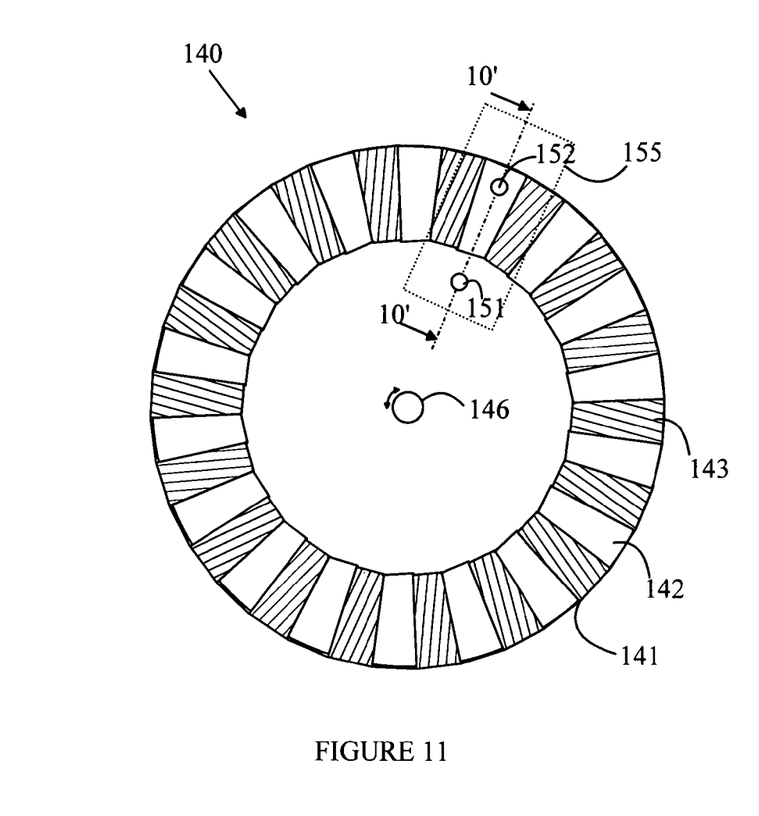
FIG. 11 is a top view of encoder 140.

Any of the above-described embodiments of an emitter-detector module can be combined with a code wheel or strip to provide an encoder according to the present invention. Refer now to FIGS. 10 and 11, which illustrate a shaft encoder that utilizes a circular code strip. FIG. 11 is a top view of encoder 140, and FIG. 10 is a cross-sectional view of encoder 140 through line 10'-10' shown in FIG. 11. Encoder 140 utilizes a circular code strip 141 having alternating reflective and absorptive stripes 143 and 142, respectively. The code strip is illuminated by an emitter-detector module 155 having a light source 151 and a photodetector 152 in a manner analogous to that described above with reference to FIG. 9. The code strip has a center coincident with that of shaft 146 whose position is encoded by encoder 140.

In the above-described embodiments of the present invention, the emitter-detector module included an encapsulation layer that covered the light source and the photodetector. In embodiments in which the encapsulation layer does not include a lens or other optical feature, the encapsulation layer can be omitted provided the light source and photodetector have a protective coating to protect these components from the environment.

Figure 12:
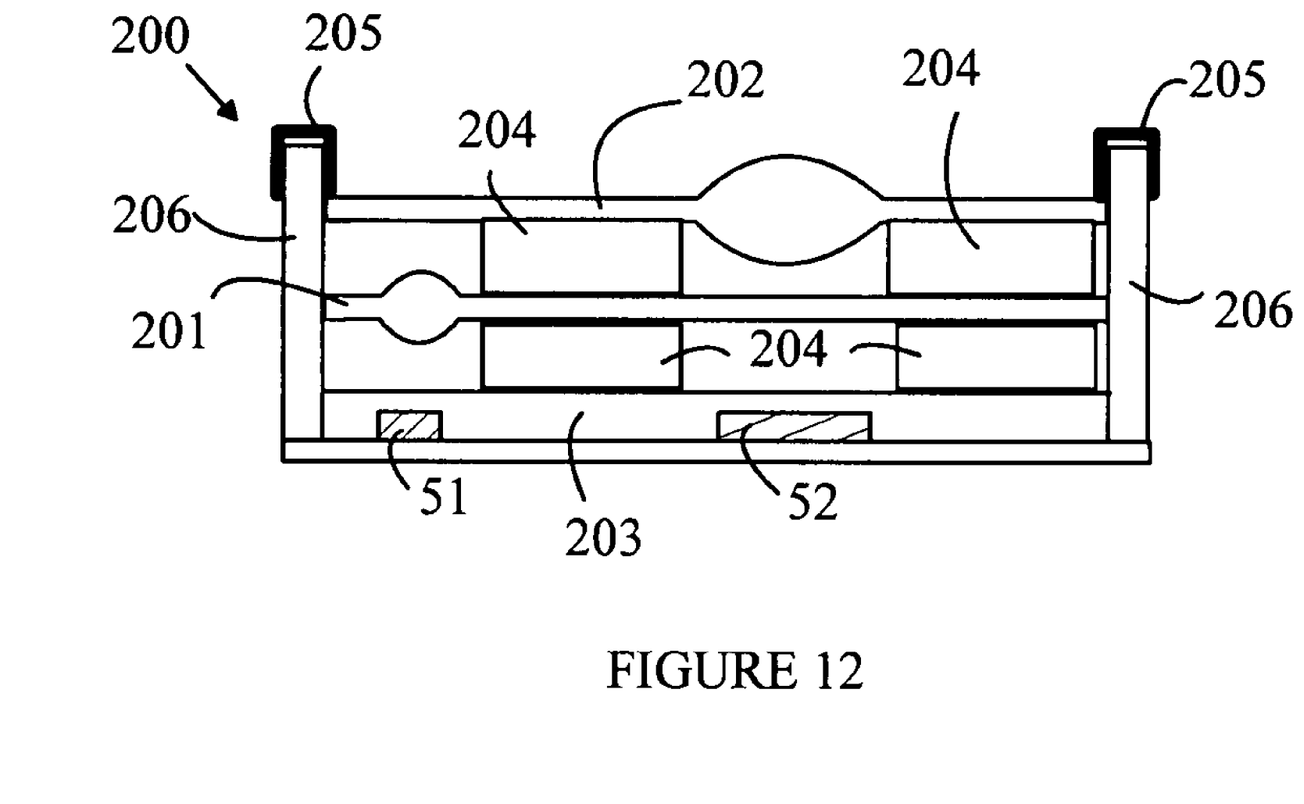
FIG. 12 is a cross-sectional view of another embodiment of an emitter-detector module according to the present invention.

The above-described embodiments of an emitter-detector module according to the present invention utilize a slot arrangement to hold the interchangeable lens inserts. However, other placement mechanisms can be utilized. Refer now to FIG. 12, which is a cross-sectional view of another embodiment of an emitter-detector module according to the present invention. Emitter-detector module 200 includes a light source 51 and photodetector 52 in an encapsulation layer 203. Lens inserts 201 and 202 are incorporated in housing 206 by stacking the lens inserts utilizing spacers 204 to position the inserts at the desired distances from the light source and the photodetector. After the lens inserts have been stacked in the housing, a clip 205 is applied to the housing to hold the component stack in place. It should be noted that the spacer plates could be clear or opaque. Opaque plates provide a means for isolating photodetector 52 from any stray light that is reflected off of the lens plates or background light. Spacer plates having different thickness can be utilized to vary the position of the lens inserts in different emitter-detector modules.

Various modifications to the present invention will become apparent to those skilled in the art from the foregoing description and accompanying drawings. Accordingly, the present invention is to be limited solely by the scope of the following claims.

What is claimed is:

1. An encoder comprising:
a code strip comprising alternating reflective and opaque stripes;
an emitter-detector module comprising a housing, a light source and a photodetector, light from said light source illuminating said code strip and light from said code strip being incident on said photodetector;
a first lens insert comprising a first lens that processes light generated by said light source before said light reaches said code strip and a second lens insert comprising a second lens that processes light after said light is reflected from said code strip, wherein said first lens insert mates with said housing at a first vertical location to position said first lens at a predetermined point relative to said light source, and said second lens insert mates with said housing at a second vertical location different than said first vertical location to position said second lens at a predetermined point relative to said photodetector, wherein said code strip moves relative to said emitter-detector module thereby causing said photodetector to generate a signal that alternates between first and second states during the operation of said encoder, and wherein said light source and said photodetector are mounted in a fixed position on a same side of said housing opposite to said code strip, with each of said first lens insert and said second lens insert being removably mounted on said housing therebetween.

2. The encoder of claim 1 further comprising a filter insert comprising an optical filter that processes light emitted by said light source or received by said photodetector.

3. The encoder of claim 1 further comprising a plurality of spacers that position first lens relative to said light source and said second lens relative to said photodetector.

4. The encoder of claim 1, said emitter-detector module further comprising a layer of optically clear encapsulant that encases said light source and said photodetector, said layer having an upper surface comprising a third lens that is positioned adjacent to one of said first lens or said second lens.

5. An encoder comprising:
- a code strip comprising alternating reflective and opaque stripes;
- an emitter-detector module comprising a housing, a light source and a photodetector, light from said light source illuminating said code strip and light from said code strip being incident on said photodetector;
- a first lens insert comprising a first lens that processes light generated by said light source before said light reaches said code strip and a second lens insert comprising a second lens that processes light after said light is reflected from said code strip, wherein said first lens insert mates with said housing at a first vertical location to position said first lens at a predetermined point relative to said light source, and said second lens insert mates with said housing at a second vertical location different than said first vertical location to position said second lens at a predetermined point relative to said photodetector, wherein said light source and said photodetector are mounted in a fixed position on a same side of said housing opposite to said code strip, with each of said first lens insert and said second lens insert being removably mounted on said housing therebetween, and each of said first lens insert and said second lens insert is movable within said housing in order to adjust the position of said first lens relative to said light source and the position of said second lens relative to said photodetector.

6. The encoder of claim 5 wherein said housing comprises a plurality of pairs of slots, each of said pairs of slots being at a different vertical position on said housing relative to said light source and said photodetector and being adapted to removably receive each of said first lens insert and said second lens insert for positioning said first lens relative to said light source and said second lens relative to said photodetector.

7. The encoder of claim 5, said emitter-detector module further comprising a layer of optically clear encapsulant that encases said light source and said photodetector, said layer having an upper surface comprising a third lens that is positioned adjacent to one of said first lens or said second lens.

8. An emitter-detector module comprising:
- a housing, a light source and a photodetector, light from said light source illuminating a code strip and light from said code strip being incident on said photodetector, wherein said light source and said photodetector are mounted in a fixed position on a same side of said housing;
- a first lens insert comprising a first lens that processes light generated by said light source before said light reaches said code strip and a second lens insert comprising a second lens that processes light after said light is reflected from said code strip, wherein said first lens insert removably mates with said housing at a first vertical location to position said first lens at a predetermined point relative to said light source, and said second lens insert mates with said housing at a second vertical location different than said first vertical location to position said second lens at a predetermined point relative to said photodetector, wherein each of said first lens insert and said second lens insert is vertically movable within said housing in order to adjust the position of said first lens relative to said light source and the position of said second lens relative to said photodetector.

9. The emitter-detector module of claim 8 further comprising a filter insert comprising an optical filter that processes light emitted by said light source or received by said photodetector.

10. The emitter-detector module of claim 8 wherein said housing comprises a plurality of pairs of slots, each of said pairs of slots being at a different position on said housing relative to said light source and said photodetector and being adapted to removably receive each of said first lens insert and said second lens insert for positioning said first lens relative to said light source and said second lens relative to said photodetector.

11. The emitter-detector module of claim 8 further comprising a plurality of spacers that position said first lens relative to said light source and said second lens relative to said photodetector.

12. The emitter-detector module of claim 8 further comprising a layer of optically clear encapsulant that encases said light source and said photodetector, said layer having an upper surface comprising a third lens that is positioned adjacent to one of said first lens or said second lens.

13. An encoder comprising:
- a code strip comprising alternating reflective and opaque stripes;
- an emitter-detector module comprising a housing, a light source and a photodetector, light from said light source illuminating said code strip and light from said code strip being incident on said photodetector;
- a lens insert comprising one of a first lens that processes light generated by said light source before said light reaches said code strip or a second lens that processes light after said light is reflected from said code strip, wherein said lens insert mates with said housing to position said first lens at a predetermined point relative to said light source or said second lens at a predetermined point relative to said photodetector, wherein said code strip moves relative to said emitter-detector module thereby causing said photodetector to generate a signal that alternates between first and second states during the operation of said encoder, and wherein said light source and said photodetector are mounted in a fixed position on a same side of said housing opposite to said code strip, with said lens insert being removably mounted on said housing therebetween; and
- a layer of optically clear encapsulant that encases said light source and said photodetector, said layer having an upper surface comprising the other of said first lens or said second lens that is positioned adjacent to said light source or said photodetector.

14. The encoder of claim 13 wherein said housing comprises a plurality of pairs of slots, each of said pairs of slots being at a different position on said housing relative to said light source and said photodetector and being adapted to removably receive said lens insert for positioning one of said first lens relative to said light source or said second lens relative to said photodetector.

* * * * *